United States Patent
Matrosov (10) Patent No.: US 7,317,977 B2
(45) Date of Patent: Jan. 8, 2008

(54) DYNAMIC STABILIZATION AND CONTROL OF AN EARTHMOVING MACHINE

(75) Inventor: Ivan Matrosov, Moscow (RU)

(73) Assignee: Topcon Positioning Systems, Inc., Pleasanton, CA (US)

( * ) Notice: Subject to any disclaimer, the term of this patent is extended or adjusted under 35 U.S.C. 154(b) by 709 days.

(21) Appl. No.: 10/924,018

(22) Filed: Aug. 23, 2004

(65) Prior Publication Data

US 2006/0041361 A1    Feb. 23, 2006

(51) Int. Cl.
*G06F 7/70* (2006.01)

(52) U.S. Cl. .................................. 701/50; 701/215
(58) Field of Classification Search .............. 701/1, 701/36, 50, 215, 213, 216; 37/907; 172/4.5
See application file for complete search history.

(56) References Cited

U.S. PATENT DOCUMENTS

| | | | |
|---|---|---|---|
| 4,807,131 A | 2/1989 | Clegg | |
| 5,375,663 A | 12/1994 | Teach | |
| 5,631,658 A | 5/1997 | Gudat et al. | |
| 5,684,696 A | 11/1997 | Rao et al. | |
| 5,860,480 A | 1/1999 | Jayaraman et al. | |
| 5,905,968 A | 5/1999 | Staub et al. | |
| 5,925,085 A | 7/1999 | Kleimenhagen et al. | |
| 5,987,371 A | 11/1999 | Bailey et al. | |
| 6,112,145 A | 8/2000 | Zachman | |
| 6,191,732 B1 | 2/2001 | Carlson et al. | |
| 6,445,983 B1 | 9/2002 | Dickson et al. | |
| 6,655,465 B2 | 12/2003 | Carlson et al. | |
| 7,065,440 B2 * | 6/2006 | Aral | 701/50 |
| 7,121,355 B2 * | 10/2006 | Lumpkins et al. | 172/4.5 |
| 2001/0023766 A1 | 9/2001 | Ohtomo et al. | |
| 2003/0137658 A1 | 7/2003 | Ohtomo et al. | |

FOREIGN PATENT DOCUMENTS

| | | |
|---|---|---|
| EP | 0 763 749 | 3/1997 |
| WO | WO 98/09207 | 3/1998 |

\* cited by examiner

*Primary Examiner*—Richard M. Camby
(74) *Attorney, Agent, or Firm*—Law Office of Jeffrey M. Weinick, LLC (57) ABSTRACT

An earthmoving machine including a control system is disclosed. The machine comprises first and second satellite navigation antennas mounted in a longitudinal direction on the earthmoving machine. A third satellite navigation antenna is mounted on a pole attached to an operational element of the earthmoving machine. In one embodiment, the earthmoving machine is a bulldozer and the operational element is a blade of the bulldozer. The machine further comprises a gravity reference sensor and a plurality of gyroscopes mounted on the machine. A computer processor generates control signals based on sensor data received from the various components. The disclosed system and method allows for dynamically stable operation of the earthmoving machine at relatively fast speeds without the development of unwanted oscillations.

24 Claims, 8 Drawing Sheets

DYNAMIC STABILIZATION AND CONTROL OF AN EARTHMOVING MACHINE

BACKGROUND OF THE INVENTION

The present invention relates generally to machine control, and more particularly to the dynamic stabilization and control of a machine.

Various types of machines, generally referred to herein as earthmoving machines, have been developed that alter the topology or geography of terrain. For example, a bulldozer with an attached and moveable cutting blade may be used in various earthmoving applications. During construction site preparation, a bulldozer may be used to level (or apply some predetermined slope) to the ground prior to construction of a building on the ground. Bulldozers are also useful in road and other construction applications. Of course, there are various uses for bulldozers and other earthmoving machines.

Initially, the operation of bulldozers was performed by skilled operators in conjunction with a ground crew, for example a crew of grade correctors equipped with surveying instruments to ensure correct grading. This mode of operation continues to be in widespread use today. One disadvantage of this mode of operation is that it is time consuming and labor intensive.

There have been various attempts at automating the operation of earthmoving machines. For example, navigation tools (such as laser systems and satellite based systems) have been employed to help automate various earthmoving tasks. For example, U.S. patent application Publication 2003/0137658 A1 published Jul. 24, 2003 discloses the use of a rotating laser in conjunction with a satellite based navigation system for use in controlling a bulldozer.

One of the constraints of existing systems is that the use of lasers for machine control requires a line of sight between the rotating laser and the construction machine. Further, in order for proper operation, there is a maximum operating distance between the rotating laser transmitter and the construction machine. While satellite navigation systems are free from the maximum distance constraint, the currently available satellite navigation systems introduce other constraints. For example, these systems generally have limited precision, especially when calculating vertical measurements. Another problem with satellite navigation machine control systems is the delay introduced into the control loop.

Another problem with existing machine control systems is dynamic instability at relatively fast operation speeds. More particularly, at fast (but not maximum) bulldozer speeds, the bulldozer and attached blade tend to oscillate, therefore resulting in inaccurate grading.

BRIEF SUMMARY OF THE INVENTION

The present invention provides an improved machine control method and apparatus that ensures dynamic stability of a machine (e.g., bulldozer) during operation at relatively fast speeds.

In one embodiment, a machine comprises first and second satellite antennas mounted on the machine and connected to satellite receivers. The satellite receivers are used to receive signals from a global navigation satellite system. A third satellite antenna is attached to at least one operational element of the machine. In a particular embodiment, the operational element may be the blade of a bulldozer. A gravity reference sensor and a plurality of gyroscopes are mounted on the machine for providing sensor data to a processor. The processor generates machine control signals based on sensor data received from the satellite receivers, gravity reference sensor, and gyroscopes.

In accordance with one embodiment, the processor determines a current state of the machine using the data from the sensors mounted on the machine. A future state of the machine is predicted using the current state and filtered position information from a prior epoch. In an advantageous embodiment, the prediction is performed using Kalman filtering. A reduced error state is calculated using the determined state and the predicted state. A delay compensated state is calculated using the reduced error state. Control signals for an operational element (e.g., bulldozer blade) are then calculated using the delay compensated state and the control signals are applied to the operational element for control of the operational element. In an embodiment in which the machine is a bulldozer, the control signals may control the elevation and slope of the blade of the bulldozer.

These and other advantages of the invention will be apparent to those of ordinary skill in the art by reference to the following detailed description and the accompanying drawings.

DETAILED DESCRIPTION

Figure 1A:
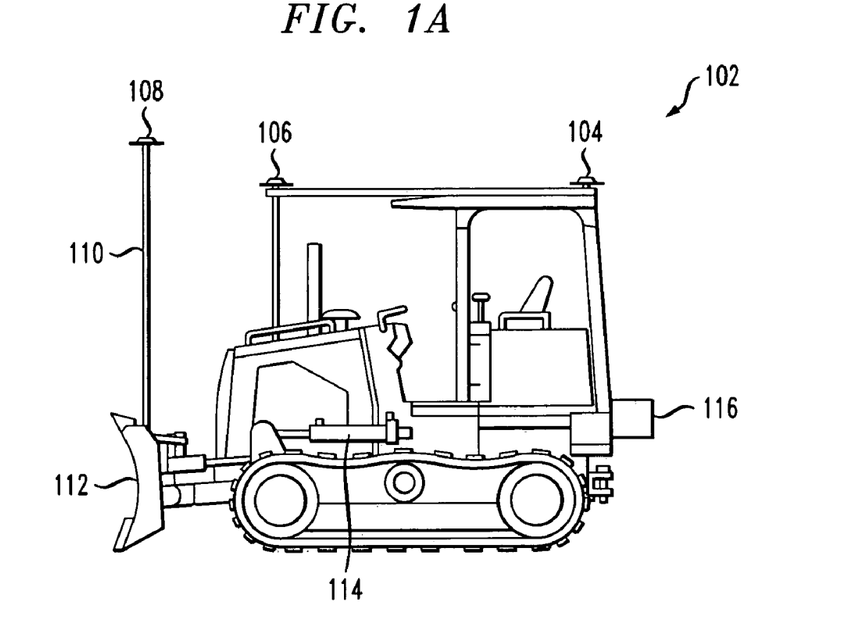
FIGS. 1A and 1B show a construction machine in accordance with one embodiment of the invention.
Figure 1B:
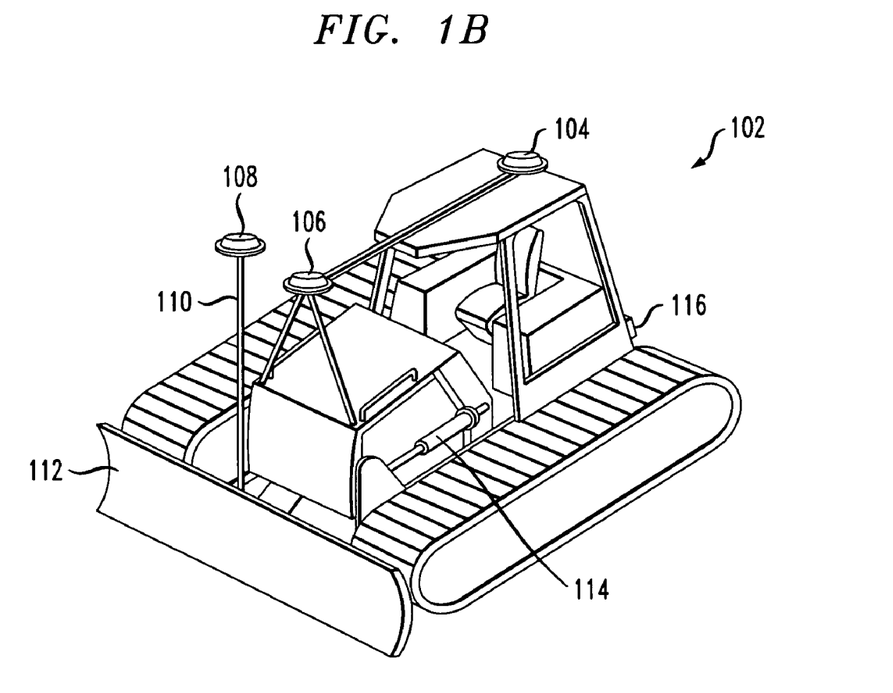

FIGS. 1A and 1B show a construction machine 102 in accordance with one embodiment of the present invention. FIG. 1A shows a side view of the construction machine 102 and FIG. 1B shows an elevated angular view of the construction machine 102. In the particular embodiment being described, the construction machine 102 is a bulldozer. However, as would be readily apparent to one skilled in the art, the principles of the present invention are applicable to other types of construction machines as well. Construction machine 102 has three satellite antennas 104, 106, 108 that are used to receive signals from Global Navigation Satellite Systems (GNSS). GNSS are well known and used to solve a wide variety of positioning/time related tasks. Two well known such systems are the Global Positioning System (GPS) of the United States and the GLObal NAvigation Satellite System (GLONASS) of Russia. For ease of reference, this description will generally refer to the GPS system, but it is to be understood that the present description is equally applicable to GLONASS, combined GPS+GLO-NASS, or other GNSS systems.

GPS antennas 104 and 106 are mounted in the longitudinal direction on the roof of the construction machine 102 (either directly or on a specially mounted frame). GPS antenna 108 is mounted on pole 110 connected to the blade 112 of the bulldozer 102. The blade 112 of the bulldozer 102 is controlled by at least one hydraulic cylinder 114. The cylinder(s) are controlled by at least one electronically controlled valve that utilizes an electrically controlled spool. In one particular embodiment, the bulldozer 102 comprises a hydraulic cylinder 114 for lifting the blade 112 and a hydraulic cylinder (not shown) for tilting (i.e., rotating around the longitudinal axis of the bulldozer) the blade 112. The valve that controls the lifting cylinder is referred to as the lifting valve, and the valve that controls the tilting cylinder is referred to as the tilting valve. The configuration of a bulldozer blade and its controlling cylinders is well known in the art and will not be described in further detail herein.

Figure 2:
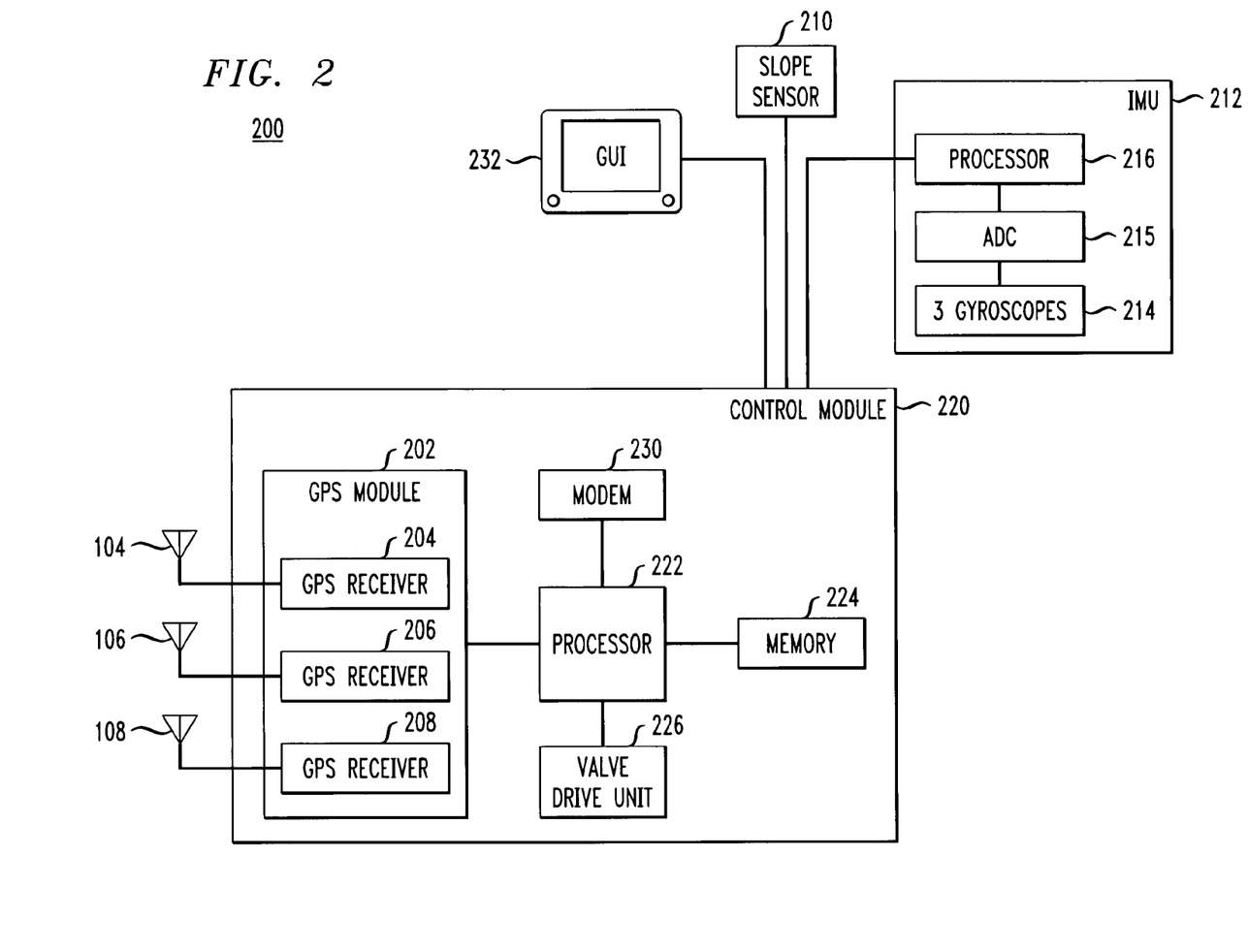
FIG. 2 is a high-level block diagram of the components of a control system for controlling a bulldozer in accordance with one embodiment of the invention.

FIG. 2 is a high-level block diagram of the components of a control system 200 for controlling the bulldozer 102 in accordance with one embodiment of the invention. System 200 contains a liquid gravity reference slope sensor 210 for determining the slope (roll) angle of the bulldozer 102. Other types of slope sensors may also be used. System 200 also contains an inertial measurement unit (IMU) 212. The IMU 212 contains three vibrating ring (or other type) gyroscopes 214 for inertial measurement. In alternate embodiments, the IMU 212 may also contain three accelerometers for inertial measurement. These sensors are advantageously oriented along three Cartesian axes of the coordinate system associated with the bulldozer mainframe (namely longitudinal, transverse and vertical). The IMU 212 also contains an analog to digital converter 215 that reads the gyroscope data at a relatively high frequency (e.g., 200 Hz) and provides the data to a processor 216. The processor 216 averages the gyroscope data and provides the averaged data to the other components as necessary at a lower frequency (e.g., 20-40 Hz). Advantageously, the IMU 212 is rigidly mounted to the mainframe of the bulldozer.

System 200 also includes control module 220 that is advantageously mounted to the mainframe of the bulldozer in a manner which protects the unit from vibration. Control module 220 contains a processor 222 for controlling the overall operation of the control module 220. Processor 222 is connected to memory 224 that contains data and program code that define the operation of the processor 222. The steps performed by the control module 220 when executing the program code in memory 224 will be described in further detail below in conjunction with FIGS. 3-11. It is to be understood that the block diagram of control module 220 is meant to be a high-level functional diagram, and not a specific description of components necessary to build a control module in accordance with the principles of the present invention. For example, memory 224 may be implemented using various components, including random access memory (RAM), read only memory (ROM), programmable ROM (PROM), electrically erasable PROM (EEPROM), optical media, magnetic media, or any other means for storing data and program code. Further, program code may be stored in one or more memory units, and the program code may be embodied in software, hardware, firmware, or any combination of the aforementioned.

Control module 220 contains GPS module 202 for processing the received satellite signals. As shown, GPS module 202 contains GPS receivers 204, 206, 208 connected respectively to GPS antennas 104,106,108. GPS receivers 204, 206, 208 operate in a manner well known in the art to determine the position of each of the antennas. In an alternate embodiment, rather than containing three separate GPS receivers, GPS module 202 may contain a single 3 antenna GPS receiver as is also well known in the art.

Control module 220 also includes a radio modem 230 for use in connection with differential GPS processing. As is well known, location determination of a rover utilizing differential GPS processing is performed relative to a Base station (Base). The precise coordinates of the Base station are known and the Base station is generally stationary during measurements. The Base station has a navigation receiver that receives and processes the signals of the satellites to generate measurements. These signal measurements are transmitted to the rover via a communication channel (e.g., wireless). The rover uses these measurements received from the Base, along with its own measurements taken with its own navigation receiver, in order to determine precisely its location. The location determination is improved in the differential navigation mode because the rover is able to use the Base station measurements in order to compensate for the major part of the strongly correlated errors in the Rover measurements. In the system 200 shown in FIG. 2, the radio modem 230 is used to receive the base station data for all three GPS receivers 204, 206, 208.

In general, the control module 220 performs the following functions. The control module 220 collects information from the other components (e.g., slope sensor 210, GUI 232 and IMU 212). The control module 220 also evaluates the design surface information that is stored in the memory 224 of the control module 220. The design surface information contains information on how the terrain should be configured by the bulldozer. This information may be displayed to the machine operator via graphical user interface (GUI) 232 which is well known in the art and allows for real time interaction with the machine operator. The control module 220 performs filtering and control generation algorithms in order to generate the control signals for the bulldozer blade. These algorithms will be described in further detail below. Processor 222 is connected to a valve drive unit 226 that converts digital control signals from processor 222 to analog control signals for control of the one or more bulldozer hydraulic valves. The hydraulic system of the bulldozer contains electrically controlled valves that allow for automated control of the hydraulic cylinders to move the blade.

The bulldozer configuration described above allows for the measurement of the Cartesian and angular position of the bulldozer body frame as well as its linear and angular velocities. More particularly, antennas 104 and 106 together with the slope sensor 210 allow for the calculation of the WGS(World Geodetic System)-84 Cartesian coordinates of any point on the bulldozer body frame as well as its orientation (pitch, roll and heading). The respective position of antenna 108 allows for the calculation of the position of the blade 112 edge as well as the position of each of the one or more hydraulic cylinders. The gyroscopes 214 of the IMU 212 allow for measurement of an angular velocity that is used for filtering and control generation as will be described in further detail below.

The sensor configuration described in the particular embodiment of FIGS. 1-2 allows for the measurements as described. However, one skilled in the art would recognize that various substitutions may be made in order to calculate the required measurements. However, elimination of one or more of the above described sensors would require the introduction of a replacement sensor(s) in order to achieve the bulldozer stability in accordance with the principles of the present invention. For example, the GPS antenna 108 connected to blade 112 may be replaced by two linear cylinder stroke sensors on each of two hydraulic cylinders controlling the bulldozer blade 112. A linear cylinder stroke sensor consists of a potentiometer mounted on a cylinder, with one end of a cable connected to the potentiometer. The other end of the cable is connected to the cylinder rod, so that any movement of the rod results in a change in the potentiometer resistance, which may then be measured by a controller. Similarly, the slope sensor 210 may be replaced by an additional GPS antenna mounted on the roof of the bulldozer 102, or by an accelerometer added to the IMU. One skilled in the art would recognize that various other configurations and substitution of sensors are possible.

The components described above in conjunction with FIGS. 1-2, along with the data processing which will be described in further detail below, provides a bulldozer control system that ensures the dynamic stability of the bulldozer during operation, thus allowing the bulldozer to operate at faster speeds than prior systems, and therefore increasing productivity. These components and the below described data processing also provide for a reduction in the GPS measurement errors and delay. Prior to providing a detailed description of the data processing algorithms, a high-level description of the processing will be given.

The control module, under control of processor 222 and computer program code stored in memory 224, performs the following high-level tasks approximately every 50 milliseconds. The first task is prediction of the position of the bulldozer for a time moment of a future GPS measurement. This prediction is performed using previously estimated machine position and velocity, new readings from the IMU and slope sensors, and information about time elapsed since the last GPS data were processed. The prediction is based on integration of a system of differential equations representing the motion of the machine.

The next task is the GPS error filtering that is performed based on a comparison of the predicted position of the machine body frame and hydraulic devices with the raw GPS measurements and geometrical constraints using a least-squares criterion such as a Kalman filter that is used to create a recursive procedure.

The next task is GPS delay compensation which is performed using time tags of the GPS signals and the actual timer readings from a GPS synchronized internal clock in order to apply the differential equations-based prediction algorithm. This task generates an estimate of the machine position for the moment of control generation of the control signals. This moment may be up to 200 ms ahead of the last set of GPS measurements.

The next task is generation of the control signals for the valves of the bulldozer. The control signals are generated based on a mathematical model (i.e., system of differential equations) of the bulldozer dynamics and position and velocity estimates (that are delay compensated and that have filtered GPS white noise errors). The control algorithm may be designed such that the machine may follow the design surface in a stable manner.

Having described the processing in a general manner, further details of the operation of a system in accordance with one embodiment of the invention will be described in conjunction with FIGS. 3-11.

Figure 3:
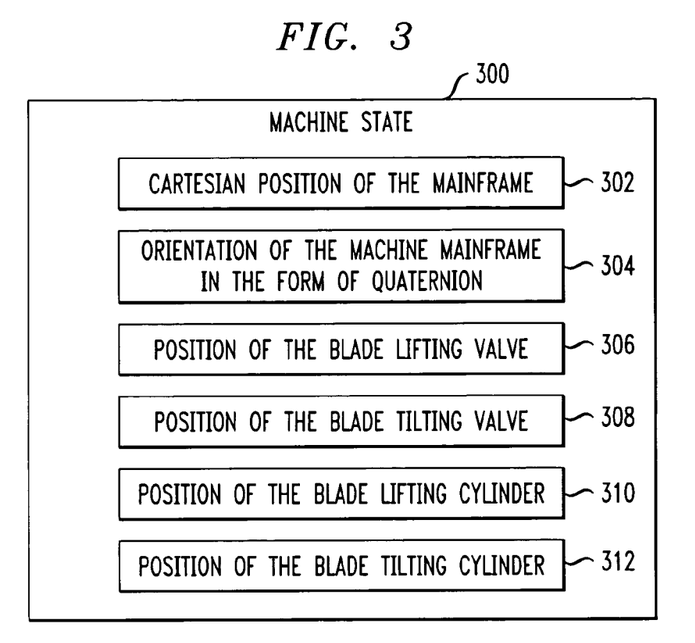
FIG. 3 represents machine state parameters that are used to describe the instantaneous state of a machine.

FIG. 3 represents the machine state parameters 300 that are used to describe the instantaneous state of the machine. These parameters include the three dimensional Cartesian position of some predetermined point on the mainframe of the bulldozer 302, the quaternion of orientation of the bulldozer's mainframe 304, the position of the spool within the blade lifting valve 306, the position of the spool within the blade tilting valve 308, the position of the blade lifting cylinder 310 and the position of the blade tilting cylinder 312. Hereinafter reference to the machine state 300 denotes the described set (vector) of 11 variables. There are 11 variables because the Cartesian position 302 consists of 3 variables (x, y, z), the orientation quaternion 304 consists of 4 variables, and each of parameters 306, 308, 310 and 312 consist of 1 variable. It is noted that orientation is usually determined by three angles: pitch, roll and heading. However, this leads to singular nonlinear differential equations of motion (namely Euler's equations). In order to simplify the nonlinear differential equations, four parameters (a, b, c, d), known as quaternion, which satisfy the condition $a^2+b^2+c^2+d^2=1$, are used in accordance with an embodiment of the present invention.

Figure 4:
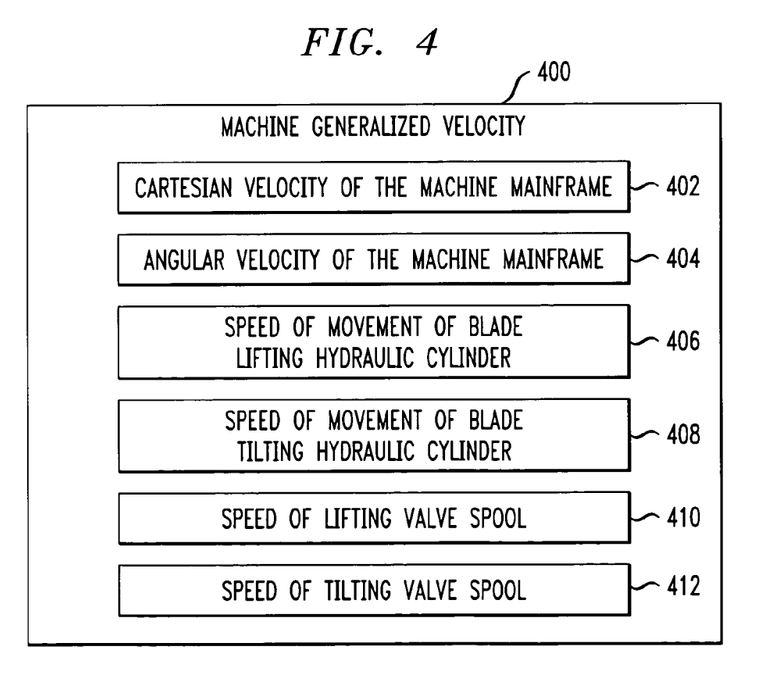
FIG. 4 represents the generalized machine velocity vector.

FIG. 4 represents the generalized machine velocity vector 400. This vector represents the speed of change for all variables included into the machine state 300. More particularly, the machine velocity vector 400 contains the Cartesian velocity vector of the machine mainframe 402, the vector of the machine's angular rotations (i.e., angular velocity) 404, the speed of movement of the blade lifting hydraulic cylinder 406, the speed of movement of the blade tilting hydraulic cylinder 408, the speed of movement of the lifting valve spool 410, the speed of movement of the tilting valve spool 412.

It is noted that various modifications of the machine state and corresponding machine velocity would be readily apparent to one skilled in the art given the description herein. For example, such modifications may include the addition of an angle of blade inclination in any direction, correspondent hydraulic cylinder and valve positions, positions of horizontal movement control valves, and pressures or flows within the hydraulic circuits.

Figure 5:
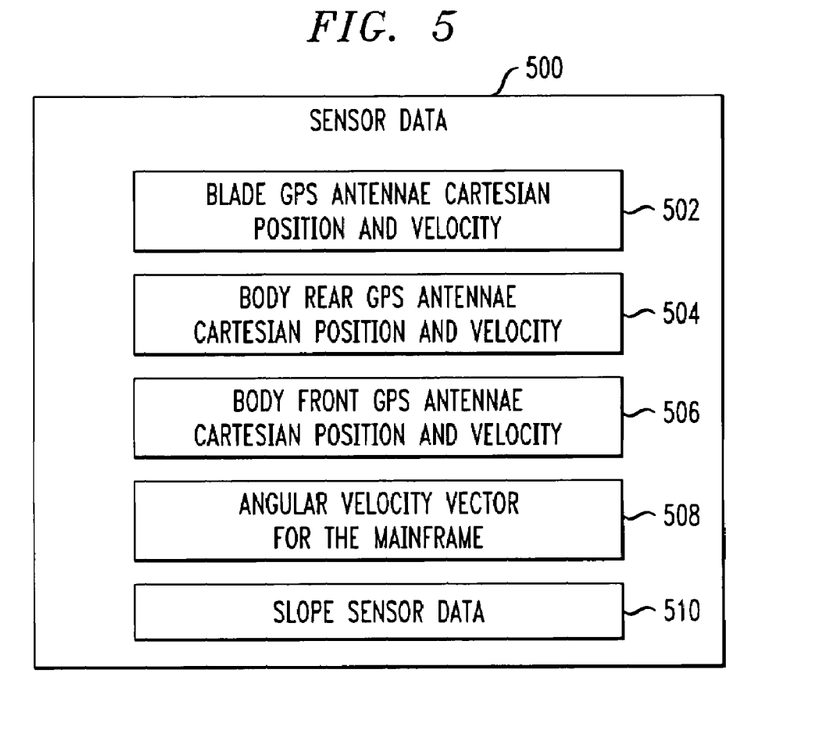
FIG. 5 represents sensor data.

FIG. 5 represents the sensor data 500, the set of available measurements from the various sensors. GPS receiver 208 provides the Cartesian position and velocity 502 of antenna 108. GPS receiver 204 provides the Cartesian position and velocity 504 of antenna 104. GPS receiver 206 provides the Cartesian position and velocity 506 of antenna 106. The three gyroscopes 214 provide three projections of the angular velocity vector 508 of the bulldozer mainframe to the coordinate system rigidly connected to the mainframe, that moves together with the machine (not global WGS-84). The slope sensor 210 provides the slope sensor data 510 which is the slope (roll) angle of the machine mainframe. Thus, there are 22 parameters in the sensor data vector 500. Cartesian position and velocity 502 of antenna 108 contains three position parameters (x, y, z) and three velocity parameters (one measurement for each of x, y, z, coordinate). Cartesian position and velocity 504 of antenna 104 contains three position parameters (x, y, z) and three velocity parameters (one parameter for each of x, y, z, coordinate). Cartesian position and velocity 506 of antenna 106 contains three position parameters (x, y, z) and three velocity parameters (one parameter for each of x, y, z, coordinate). The vector of angular velocity 508 contains three parameters from the three gyroscopes. The slope sensor data 510 contains one parameter.

It is noted that the sensor data may be corrupted by various types of errors, such as GPS errors and gyroscope errors, which errors are caused by objective physical sources such as RF noise, vibration, multi path, etc. In accordance with one embodiment of the invention, and as described in further detail below, such errors are reduced by the use of digital filters.

Figure 6:
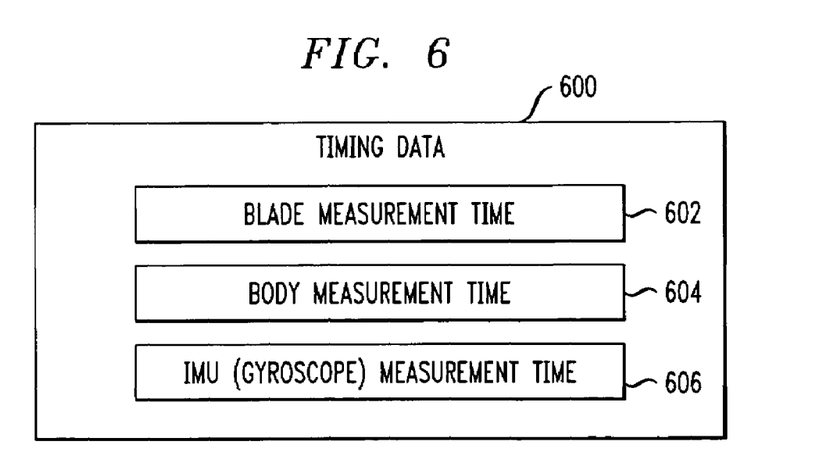
FIG. 6 represents timing data.

The GPS receivers 204, 206, 208, and the IMU 212, each have an internal clock (not shown in FIG. 2). The GPS receiver clocks are synchronized with global GPS time, and the IMU clock is synchronized with the GPS clocks. FIG. 6. shows the timing data 600 that are read from the GPS and IMU clocks. Three time tags are used: Blade position GPS measurement time 602, machine body position GPS measurement time 604, and IMU gyroscope measurement time 606.

FIGS. 7-11 are flowcharts representing the steps performed by the control module 220 to estimate the state of the machine and to generate the control signals for operation of the machine. It is noted that these figures show both control flow (i.e., the sequence of execution of functional steps) and data flow (i.e. the passing of data between functional steps). Generally, control flow is shown by solid lines and data flow is shown by broken lines.

Figure 7:
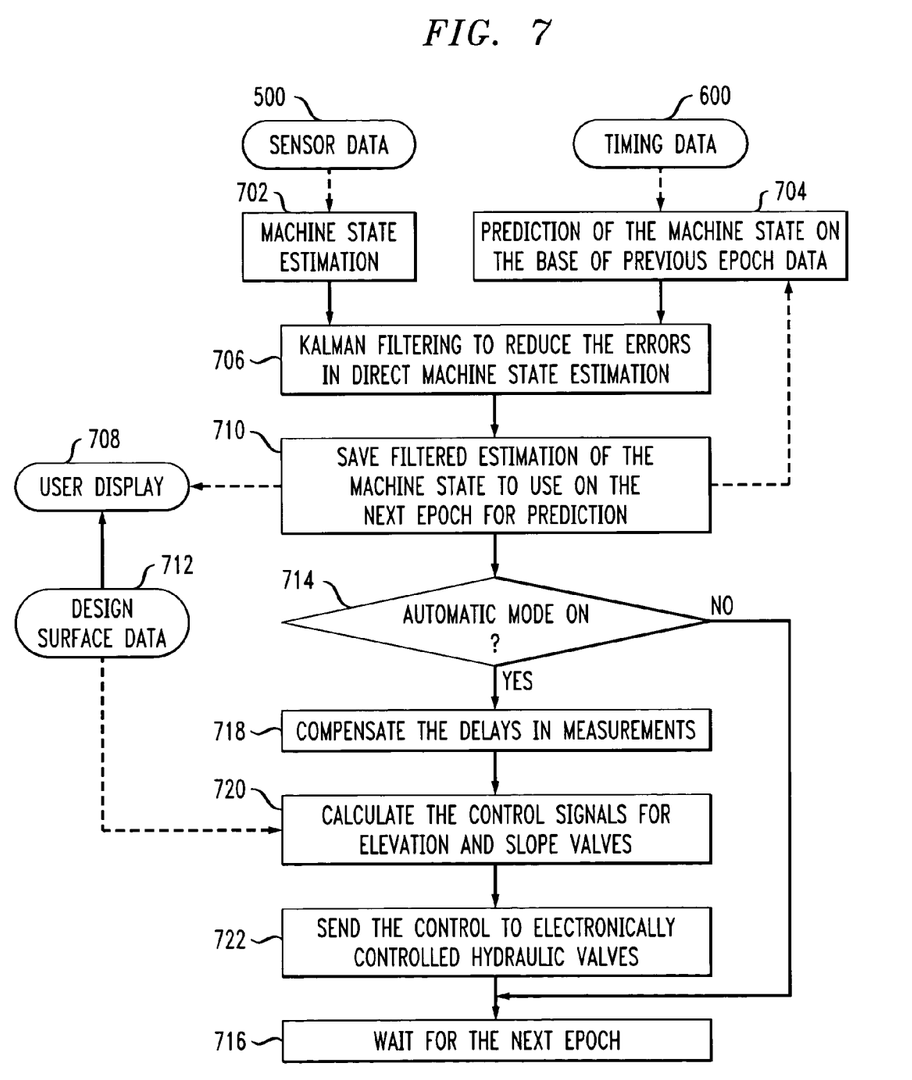
FIG. 7 is a flowchart showing the high-level steps performed by the control module during a time epoch.

FIG. 7 is a flowchart showing the high-level steps performed by the control module 220 during a time epoch. For each time epoch, for example each ⅒ of a second, the functioning starts with receiving (and/or collecting) the sensor data 500 and timing data 600. These data are used by processor 222 to perform the following tasks. In step 702 the machine state 300 is estimated using sensor data 500. In this step, the machine state 300 is recalculated using raw GPS and slope sensor data and necessary linear sizes. The resulting estimate, referred to as a direct estimate, is a first calculation for future improvements on the next steps. The geometrical sizes of the machine used within this step is height of the GPS mounting pole, position of the antennae 104, 106 with respect to the coordinate system, the positions of the blade frame hinges, the positions of the blade tilt hinges, etc. During this step, the GPS errors will be transformed into errors within the result of direct estimation. If the algorithm is processing an epoch other than the first epoch, and therefore the previous estimation of the machine state is available, then step 704 is performed in which the machine state is predicted based on previous epoch data and estimates. Further details of step 704 will be described in further detail below in conjunction with FIG. 8.

In step 706, using both the estimated machine state from step 702 and the predicted machine state from step 704, Kalman filtering is performed in order to use all available properly weighted GPS data. Step 706 is described in further detail below in conjunction with FIG. 9. This more precise (e.g., filtered) estimation of the machine state generated in step 706 is saved in step 710 for future use in the next execution of step 704. This more precise estimation is also sent to user display (GUI) 708. Next, in step 714, it is determined whether the machine is operating in automatic mode (i.e. under automated control) or manual mode (i.e. under the control of an operator). If manual, then the determination of step 714 will be NO and the algorithm stops and waits for the next epoch of measurements (step 716). At the next epoch, processing will begin again with steps 702 and 704.

If the machine is in automatic mode, then processing continues with step 718 which compensates for measurement delays. Generally, step 718 performs extrapolator-based delay compensation to reduce measurement delays (for usual hardware, the ordinary delay lies within the interval ~50-200 milliseconds). Further details of step 718 will be described below in conjunction with FIG. 10. After the delay compensation, the machine control signals are generated in step 720. Step 720 also uses the design surface data 712 during its calculation of the control signals. Further details of step 720 will be described below in conjunction with FIG. 11. After calculation of the control signals, the control signals are sent to the electronically controlled hydraulic valves of the machine in step 722. At this point, the algorithm stops and waits for the next epoch of measurements (step 716). At the next epoch, processing will begin again with steps 702 and 704.

Figure 8:
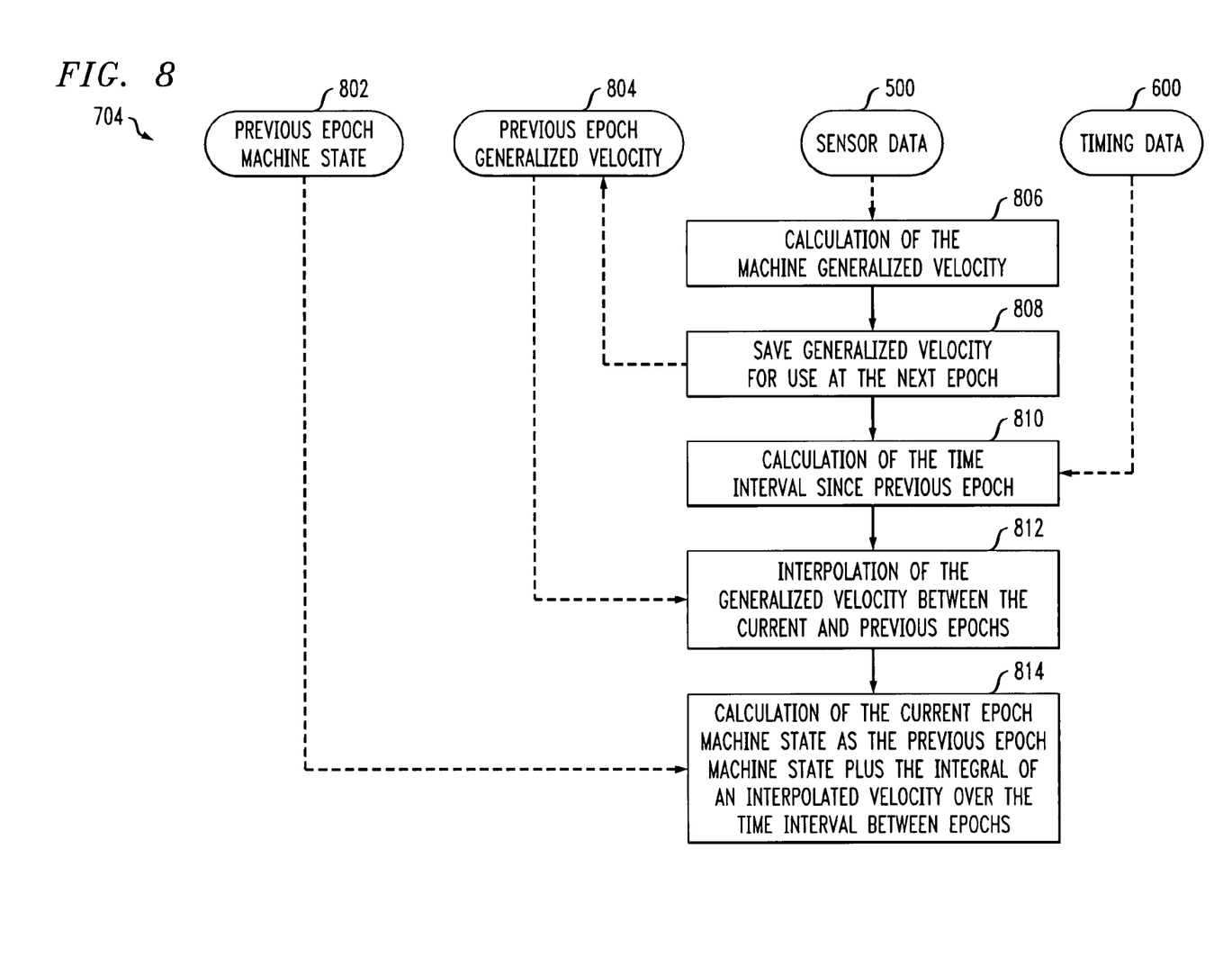
FIG. 8 is a flowchart showing further details of the prediction step of FIG. 7.

Further details of the prediction step (704) will now be described in conjunction with FIG. 8. The aim of this algorithm is to prepare the necessary data for the Kalman filtering (step 706). As described above, step 704 will be executed on the second epoch and thereafter, so it is possible to use the previous epoch's machine state 802 and generalized velocity 804 as well as the current epoch's sensor data 500 and timing data 600. First, in step 806, the current epoch's estimate of the machine generalized velocity is calculated from sensor data 500 using the geometry of the machine and quaternion algebra. In step 808 the data calculated in step 806 are saved for future use in the next epoch (and for use during delay compensation described in conjunction with FIG. 10).

In step 810, the time interval since the previous epoch is estimated using timing data 600. This time interval estimate is then used in step 812 to interpolate linearly the generalized velocity for the current time interval. In step 814 the predicted machine state is calculated by addition of the generalized velocity integrated for the time interval since the previous epoch, and the previous machine state estimation.

Figure 9:
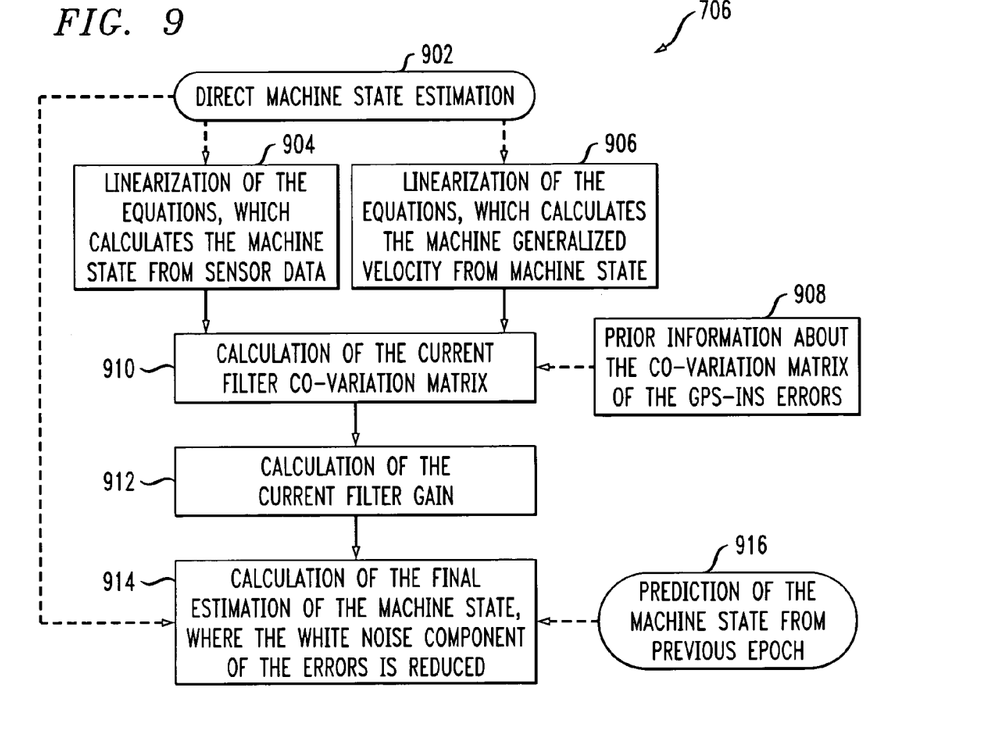
FIG. 9 is a flowchart showing further details of the Kalman filtering step of FIG. 7.

Further details of the Kalman filtering step (706) will now be described in conjunction with FIG. 9. While general-purpose Kalman filtering algorithms are known, the particular technique described herein for GPS error reduction in a bulldozer control system is made possible by the inventive set of sensors described herein, and is not possible within the prior art systems. The algorithm is based on linearization of two functions, machine state to generalized velocity function (step 904), and sensor data to machine state function (step 906) using the direct machine state estimation 902 determined in step 702. As usual for Kalman filters, there is a need to have a covariance matrix for all of the errors within the system. The entire bulldozer control system is affected by the following sources of noise: GPS noise (error), IMU noise and slope sensor noise. These sources of noise may be estimated in advance (e.g., during laboratory and field tests). The results of such estimation is then transformed into an a priori covariance matrix, denoted 908 in FIG. 9. Then, using this a priori information about noise, the current estimation of covariance matrix is calculated in step 910. Then, in step 912 the filter gain is calculated. Next, in step 914 the final optimal estimation of the machine state is calculated using the prediction of the machine state from the previous epoch 916.

Figure 10:
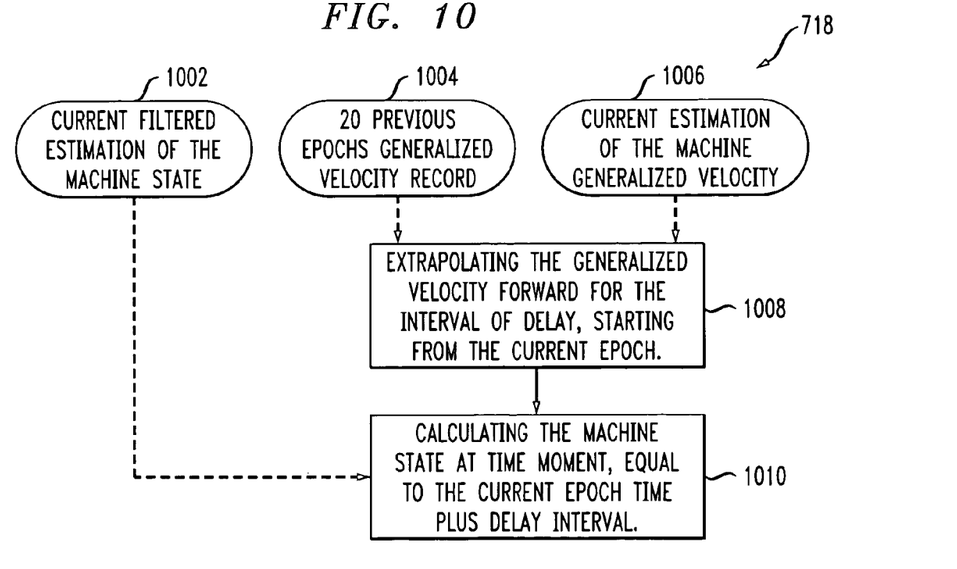
FIG. 10 is a flowchart showing further details of the delay compensation step of FIG. 7.

Further details of the delay compensation step (718) will now be described in conjunction with FIG. 10. This step is somewhat similar to the prediction of step 704, but there are also some differences. First, in step 704, the velocity components are available using the sensor data, so to estimate the velocity it is reasonable to use interpolation. However, in this delay compensation step (718), the sensor data are no longer available, and the velocity measurements are extrapolated forward for the interval of delay, starting from the current epoch, in step 1008. The finite time interval weighted least-square algorithm with parabolic approximation is used for the extrapolation. This uses not only the data from the previous epoch 1006, but also the record of 20 such prior epochs 1004. These recorded data are approximated by a parabolic function to achieve the least mean square deviation between the two. The result of extrapolation (namely the value of the parabolic function in future time moments) is then used not only within the current algorithm, but is also exported for use during control signal calculation of step 720. In step 1010, the differential equations of motion are integrated forward for the interval of delay to result in the final machine state estimate with no delay, but this estimate is affected by an extrapolation error. For comparably fast speeds of motion of the machine (more than 1 m/s) this extrapolation error appears to be approximately 20 times less than the error caused by non-compensated measurements delay. The system of differential equations of motion (i.e. dynamic model, or in other terms the predictor, of the machine) to be integrated forward needs three items of information: the initial data, the estimates of the generalized velocity and the time interval. The best estimation of initial data available for the system at the current step is the result of the Kalman filtering at step 706, which is used here. The generalized velocity comes from parabolic extrapolation at step 1008. The time interval is equal to some fixed a priori estimate.

Figure 11:
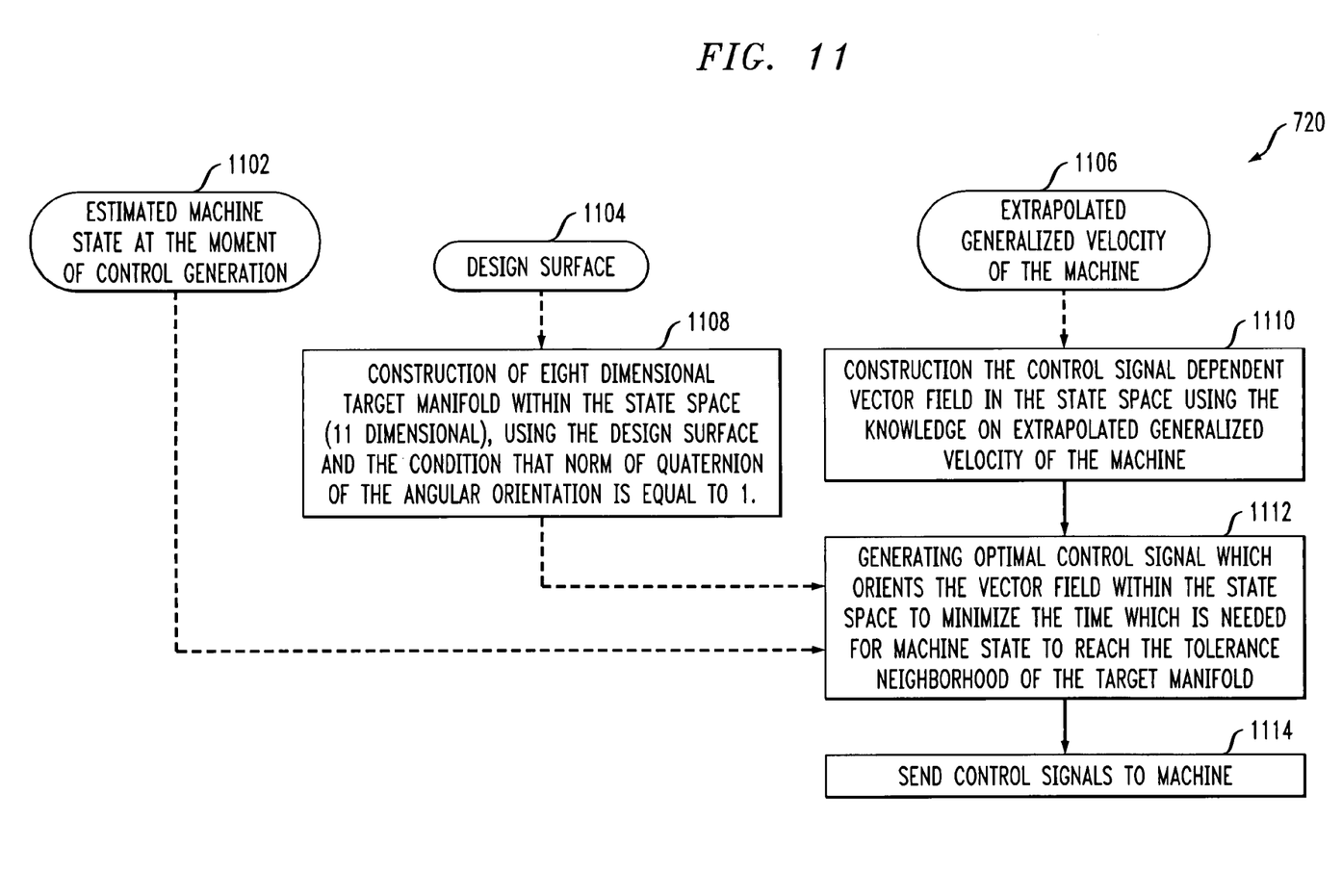
FIG. 11 is a flowchart showing further details of the calculation of control signals step of FIG. 7.

Further details of the calculation of control signals (step 720) will now be described in conjunction with FIG. 11. At this point, the system has an accurate estimation of the machine state 1102 and machine generalized velocity obtained from step 718. Due to the proposed comprehensive set of measurements and filtered delay free estimation of the machine state in accordance with the techniques of the present invention, it is possible to apply various known theories of stability and control to the entire bulldozer control system. Such theories are described, for example, in H. K. Khalil, Nonlinear Systems, Prentice Hall, 3rd edition (Dec. 18, 2001) and A. F. Filippov, Differential Equations with Discontinuous Righthand Sides, edited by F. M. Arscott, Kluwer Academic Publishers, (December 1988). The algorithm shown in FIG. 11 is quite calculation intensive, but it ensures the stability of the earthmoving machine. Thus, the use of the inventive techniques allows for oscillation-free grading at relatively fast horizontal velocity.

The algorithm begins in step 1108 with the calculation of an eight dimensional target manifold within an 11 dimensional state space. This step 1108 uses the design surface data 1104. By denoting the abstract 11 dimensional space within which the machine state 300 belongs as the state space, the design surface (i.e., the digital terrain model) can be represented as an eight dimensional smooth manifold within the state space. Any point in the state space represents the particular machine state corresponding to a point in the state space, and the generalized velocity is a vector, applied to the particular point. The general velocity vector depends on the control signals. The entire set of possible vectors is referred to as the vector field. Having the control signals chosen, integrating this vector field provides the possible trajectory of the machine. The vector field depends on the controls, which are yet unknown, so choosing the values of control signals, within the set of admissible ones, the vector field may be changed (i.e., reoriented). The vector field is generated in step 1110 using knowledge of the extrapolated generalized velocity of the machine 1106 (which was calculated in step 718). The performance of the machine will be improved if the controls are chosen such that the integration of the vector field gives a machine state which reaches the tolerance neighborhood of the target manifold in minimum possible time and remains there in the future. Thus, the problem of controlling the machine is reduced to the problem of reorientation of the vector field, which is a special kind of constrained minimization problem, and is solved by a continuous type Newton-like method in step 1112 using the estimated machine state 1102, the estimated machine generalized velocity (from step 718) and the eight dimensional target manifold from step 1108. The machine controls must, of course, be within the boundaries of admissible control of the machine. The continuous type Newton like method, having the above described information and criterion, constructs the special differential equations for the control variables, which are then added to the equations of the machine to be integrated together. The calculated control signals are sent to the valve driver circuit of the machine in step 1114.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

The invention claimed is:

1. A machine comprising:
   a first and second satellite antenna mounted in a longitudinal direction on said machine and connected to a satellite receiver;
   a third satellite antenna attached to an operational element of said machine and connected to a satellite receiver;
   a gravity reference sensor mounted on said machine;
   a plurality of gyroscopes mounted on said machine; and
   a computer processor for generating control signals based on sensor data received from said satellite receivers, gravity reference sensor; and said plurality of gyroscopes.

2. The machine of claim 1 wherein said computer processor is configured to:
   determine a current state of the machine using said sensor data;
   predict a future state of the machine using said current state and position information from a prior epoch;
   calculate a reduced error state utilizing said determined state and said predicted state;
   calculate a delay compensated state of the machine;
   calculate control signals for said operational element; and
   apply said control signals to said operational element.

3. The machine of claim 2 wherein the state of the machine comprises one or more of: the position of the machine mainframe, the orientation of the machine mainframe, the position of said operational element, the position of a control mechanism of said operational element.

4. A method for operating a machine comprising the steps of:
   determining a current state of the machine using data from sensors mounted on said machine;
   predicting a future state of the machine using said current state and filtered position information from a prior epoch;
   calculating a reduced error state using said determined state and said predicted state;
   calculating a delay compensated state of the machine using said reduced error state;

calculating control signals for at least one operational element of said machine using said delay compensated state; and applying said control signals to said at least one operational element.

5. The method of claim 4 further wherein said step of predicting further comprises the step of Kalman filtering.

6. The method of claim 4 wherein said machine is a bulldozer and said at least one operational element is a blade, and wherein said step of calculating control signals further comprises the step of calculating control signals for elevation and slope of said blade.

7. The method of claim 4 wherein said step of predicting further comprises the steps of:

calculating a generalized velocity of the machine;
calculating a time interval since a previous epoch;
interpolating the generalized velocity between the current and previous epochs; and
adding the generalized velocity integrated for time interval since the previous epoch and the previous machine state estimation.

8. The method of claim 7 wherein said step of calculating a delay compensated state of the machine further comprises the step of:

extrapolating said generalized velocity forward for an interval of said delay.

9. The method of claim 4 wherein said step of calculating control signals for at least one operational element of said machine further comprises the steps of:

calculating a target manifold within a state space of said machine using design surface data;
calculating a control signal dependent vector field in said state space; and
generating a control signal which orients the vector field within the state space to minimize the time which is needed for the machine state to reach a tolerance neighborhood of the target manifold.

10. The method of claim 4 wherein the state of the machine comprises one or more of: the position of the machine mainframe, the orientation of the machine mainframe, the position of a blade of said machine, the position of a control mechanism of said blade.

11. A method for controlling a machine comprising a first and second satellite antenna mounted in a longitudinal direction on said machine and connected to a satellite receiver, a third satellite antenna attached to an operational element of said machine and connected to a satellite receiver, a gravity reference sensor, a plurality of gyroscopes mounted to said machine, and a computer processor for processing data received from said satellite receivers, gravity reference sensor; and said plurality of gyroscopes, said method comprising the steps of:

determining a current state of the machine;
predicting a future state of the machine using said current state and position information from a prior epoch;
calculating a reduced error state utilizing said determined state and said predicted state;
calculating a delay compensated state of the machine;
calculating control signals for said operational element of said machine; and
applying said control signals to said operational element.

12. The method of claim 11 further wherein said step of predicting further comprises the step of Kalman filtering.

13. The method of claim 11 wherein said machine is a bulldozer and said operational element is a blade, and wherein said step of calculating control signals further comprises the step of calculating control signals for elevation and slope of said blade.

14. The method of claim 11 wherein said step of predicting further comprises the steps of:

calculating a generalized velocity of the machine;
calculating a time interval since a previous epoch;
interpolating the generalized velocity between the current and previous epochs; and
adding the generalized velocity integrated for time interval since the previous epoch and the previous machine state estimation.

15. The method of claim 14 wherein said step of calculating a delay compensated state of the machine further comprises the step of:

extrapolating said generalized velocity forward for an interval of said delay.

16. The method of claim 11 wherein said step of calculating control signals for said operational element of said machine further comprises the steps of:

calculating a target manifold within a state space of said machine using design surface data;
calculating a control signal dependent vector field in said state space; and
generating a control signal which orients the vector field within the state space to minimize the time which is needed for the machine state to reach a tolerance neighborhood of the target manifold.

17. The method of claim 11 wherein the state of the machine comprises one or more of: the position of the machine mainframe, the orientation of the machine mainframe, the position of a blade of said machine, the position of a control mechanism of said blade.

18. A computer readable medium storing computer program instructions which are executable on a computer processor for implementing a machine control system, said computer program instructions comprising instructions defining the steps of:

determining a current state of the machine using data from sensors mounted on said machine;
predicting a future state of the machine using said current state and filtered position information from a prior epoch;
calculating a reduced error state using said determined state and said predicted state;
calculating a delay compensated state of the machine using said reduced error state;
calculating control signals for at least one operational element of said machine using said delay compensated state; and
applying said control signals to said at least one operational element.

19. The computer readable medium of claim 18 further wherein said computer program instructions defining the step of predicting further comprise computer program instructions defining the step of Kalman filtering.

20. The computer readable medium of claim 18 wherein said machine is a bulldozer and said at least one operational element is a blade, and wherein said computer program instructions defining the step of calculating control signals further comprise computer program instructions defining the step of calculating control signals for elevation and slope of said blade.

21. The computer readable medium of claim 18 wherein said computer program instructions defining the step of predicting further comprise computer program instructions defining the steps of:

calculating a generalized velocity of the machine;
calculating a time interval since a previous epoch;
interpolating the generalized velocity between the current and previous epochs; and
adding the generalized velocity integrated for time interval since the previous epoch and the previous machine state estimation.

22. The computer readable medium of claim 21 wherein said computer program instructions defining the step of calculating a delay compensated state of the machine further comprise computer program instructions defining the step of:

extrapolating said generalized velocity forward for an interval of said delay.

23. The computer readable medium of claim 18 wherein said computer program instructions defining the step of calculating control signals for at least one operational element of said machine further comprise computer program instructions defining the steps of:

calculating a target manifold within a state space of said machine using design surface data;
calculating a control signal dependent vector field in said state space; and
generating a control signal which orients the vector field within the state space to minimize the time which is needed for the machine state to reach a tolerance neighborhood of the target manifold.

24. The computer readable medium of claim 18 wherein the state of the machine comprises one or more of: the position of the machine mainframe, the orientation of the machine mainframe, the position of a blade of said machine, the position of a control mechanism of said blade.

* * * * *